Jan. 5, 1943. DE W. WEBSTER 2,307,611
WRECKING TRUCK
Filed Dec. 5, 1941 3 Sheets-Sheet 3

Inventor
DEWITT WEBSTER

By Ross J. Woodward
Attorney

Patented Jan. 5, 1943

2,307,611

UNITED STATES PATENT OFFICE 2,307,611

WRECKING TRUCK

De Witt Webster, Milton, Fla.

Application December 5, 1941, Serial No. 421,833

3 Claims. (Cl. 214—86)

This invention relates to a towing truck and more particularly to trucks of the type used for towing automobiles wrecked in collisions or otherwise damaged so that they must be towed to a service station for repair.

It is one object of the invention to provide a towing truck with a hoisting crane mounted over the rear portion of its body or chassis in such position that a hook or other grapple carried by a cable wound upon the drum of the crane may be engaged under a portion of the wrecked automobile and the cable then wound upon its drum to lift the engaged end of the automobile and raise it to position for towing.

Another object of the invention is to provide a towing truck wherein the crane has a drive shaft so connected with a power take-off of the transmission of the truck that the crane may be powered from the engine of the truck and thus power operated instead of the drive shaft of the crane being turned by hand.

Another object of the invention is to provide the crane with a power drive wherein motion is transmitted to the shafts of the crane through the medium of a transmission similar to the transmission for the rear wheels of the truck, the transmission for the crane being connected with the power take-off of the truck by a countershaft having universal joints at its ends so that it may extend in angular relation to the transmission for the crane.

Another object of the invention is to provide auxiliary means for imparting rotation to the countershaft of the transmission when it is desired to unwind the cable from the drum and thus permit the automobile engaging hook to move of its own weight to a lowered position after the towing truck has been backed into place in front of or at the rear of the automobile to be towed.

Another object of the invention is to provide a towing vehicle of this character wherein the auxiliary means for imparting retrograde rotation to the countershaft consists of an electric motor driven by current from the usual battery provided for the truck, motion being transmitted from the electric motor to the countershaft by a belt trained about pulleys on the motor shaft and the countershaft.

Another object of the invention is to provide an improved brake mechanism for controlling rotation of the drive shaft for the crane and permitting the operator of the truck to stop such rotation when desired.

Another object of the invention is to provide a wrecking truck with improved driving means for the crane which may be easily installed in connection with a truck having a manually operated crane and transform the crane into a power-driven crane.

Another object of the invention is to provide a truck with a crane having a power drive which is simple in construction, easy to install and operate, and very strong and efficient in operation, as well as not liable to get out of order.

Figure 1:
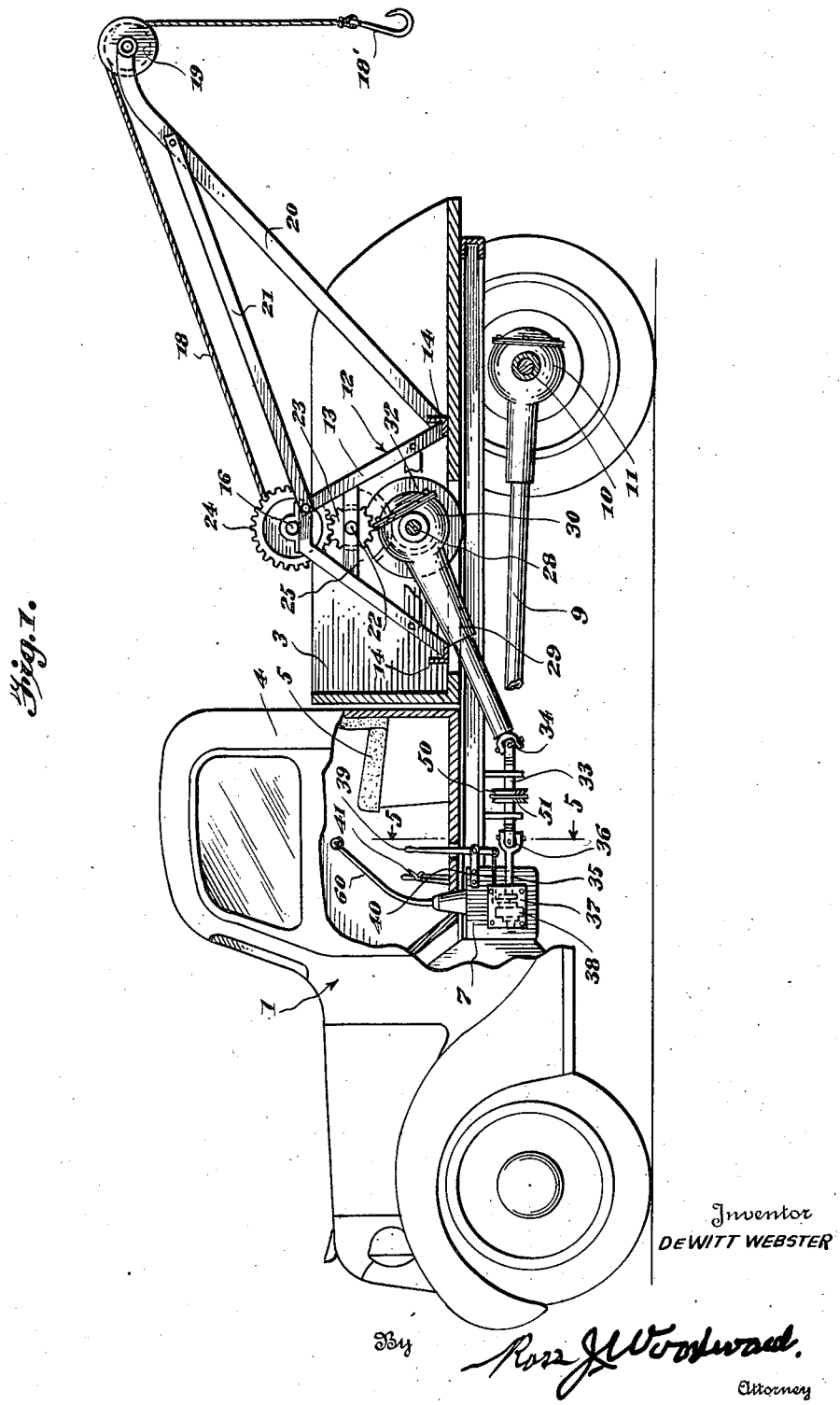
Fig. 1 is a view partially in side elevation and partially in section, showing a wrecking truck having a crane equipped with a power drive of the improved construction.

The wrecking truck is indicated in general by the numeral 1 and embodies a chassis carrying a work body 3 back of a cab 4 in which is the usual driver's seat 5 and into which extends the usual gear shift lever 6 of the transmission 7. The transmission 7 is in its usual position back of the engine 8 and has a power take-off 7' at its side. There has also been provided the usual transmission shaft 9 from which rotary motion is imparted to the rear axle by a differential 11 of conventional construction.

The wreck-wagon or truck is to be employed for towing disabled automobiles to a service station and, in order that the front or rear end of the automobile to be towed may be lifted to towing position, there has been provided a crane 12 having side frames 13 mounted at their lower ends on cross bars or bolsters 14. A drum 15 extends between upper ends of the side frames and is rotatably mounted by stub shafts 16 extending from its ends and rotatably mounted through bearings 17 carried by the side frame. This drum carries a cable 18 which may be formed of wire or chain and extends rearwardly from the drum with a portion trained over the pulley 19 at the upper rear ends of the arms or forks 20 which are secured at their lower ends to the rear bolster and are braced by bracing bars 21. At its free end, the cable carries a hook or grapple 18'. A countershaft 22 is rotatably mounted through the frame of the crane below the drum and, at one end, carries a small gear 23 meshing with a large gear 24 carried by the drum. At its other end, the countershaft carries a large gear 25 through the medium of which rotary motion is transmitted to the countershaft and, in order that rotation of this shaft in a direction for unwinding the cable from the drum may be prevented after the automobile has been lifted to towing position, there has been provided a latch 26 carried by one side frame 13 and pivotally mounted for movement into and out of position for engagement with teeth of the gear 25.

In wrecking wagons or trucks of conventional construction, the countershaft of the crane is driven from a manually operated drive shaft which is rotatably mounted between the cross bars 27 of the side frames 13 and carries a small gear or pinion meshing with the gear 25 of the countershaft 22. In this improved wreck-wagon, rotary motion is transmitted to the countershaft 22 from a drive shaft 28 similar in construction to the rear shaft 10 of the truck and receiving rotary motion from a drive or shaft 29 operatively connected with the drive shaft 28 by a differential 30 of conventional construction. The drive shaft 28 carries a small gear or pinion 31 meshing with the gear 25 of the countershaft 22 and also is equipped with a brake 32 for controlling unwinding of the cable from the drum and preventing the cable from unwinding at excessive speed when an automobile is to be lowered to the ground after reaching its destination. The drum may also be set after raising the automobile to towing position and thus prevent turning of the drum in an unwinding direction in case the latch 26 should slip loose or become broken during towing of the automobile to the service station.

The drive or shaft 29 extends forwardly at a downward incline through an opening in the bottom of the work body and, at its front end, is connected with a countershaft 33 by a universal joint 34. The countershaft 33 extends longitudinally of the truck in a horizontal position under the car and its front end is connected with a power take-off shaft 35 by another universal joint 36. The shaft 35 extends forwardly from the countershaft into a casing 37 at the power take-off side of the transmission casing 7 and carries a gear 38 which is keyed to the shaft 35 but is slidable along this shaft into and out of position for meshing with a gear on countershaft in transmission 7'. It will thus be seen that by actuating the lever 39 which is connected with the gear 38 by a link or rod 40, the gear may be moved into and out of operative position and operation of the crane from the motor of the truck controlled by the driver occupying the seat 5 of the truck. The emergency brake lever 41 of the truck is located at either side of the transmission casing 7 from the lever 39 and adjacent this lever 41 is mounted another brake lever 42 to which is attached a light wire cable 43. The cable 43 passes through a tube 44 to the brake 32 to which it is connected in a conventional manner and, when the lever 42 is moved to a brake-applying position, the brake will be applied to the drive shaft 28 and rotation of the drum may be checked or entirely prevented, according to how tight the brake is applied.

Figure 2:
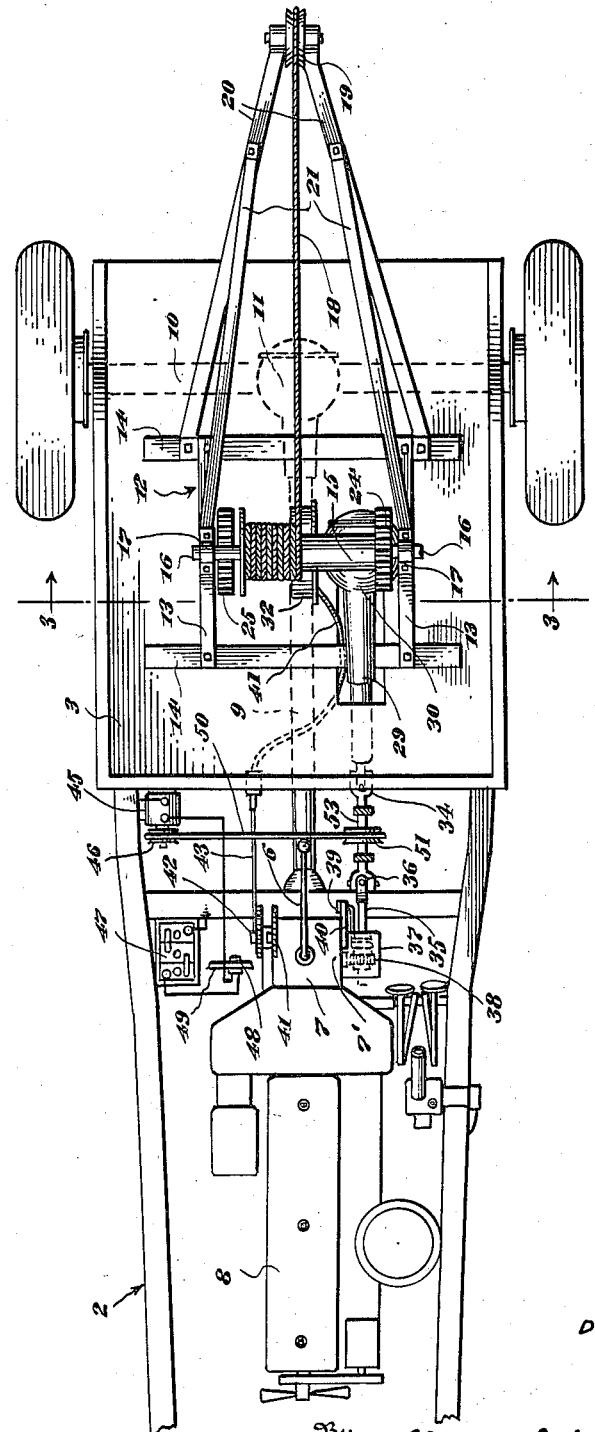
Fig. 2 is a top plan view of the improved wrecking truck.
Figure 3:
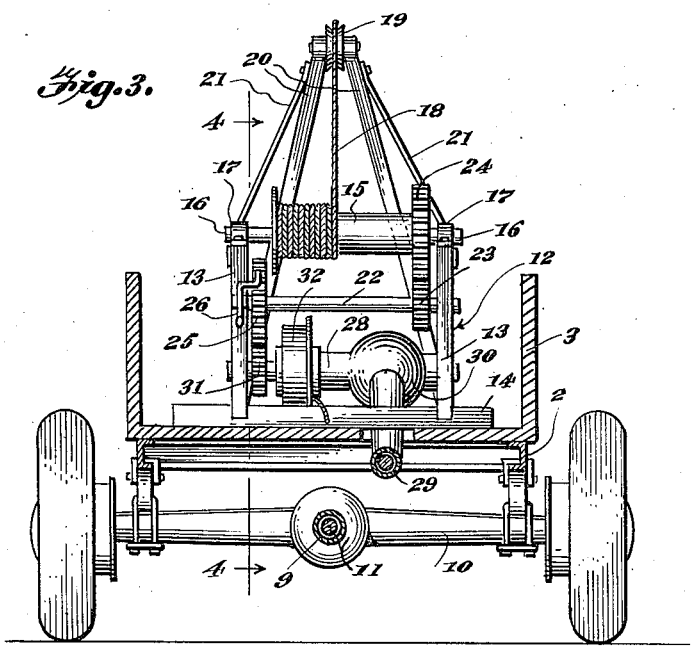
Fig. 3 is a vertical transverse sectional view on the line 3—3 of Fig. 2.
Figure 4:
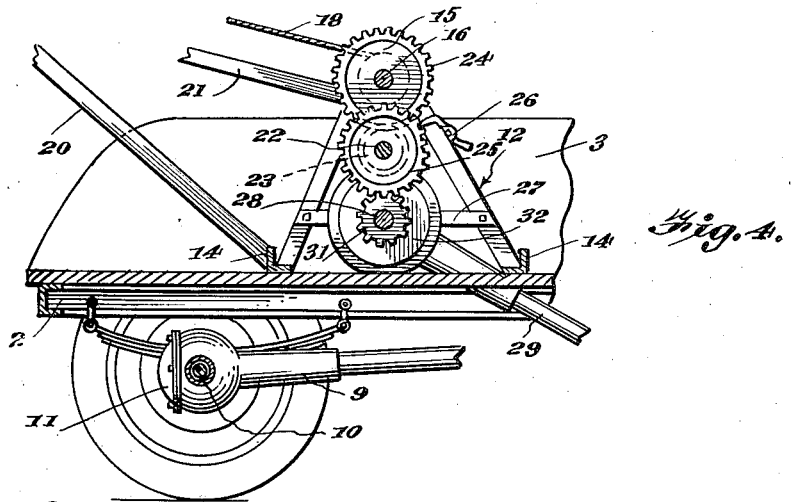
Fig. 4 is a fragmentary sectional view on the line 4—4 of Fig. 3.
Figure 5:
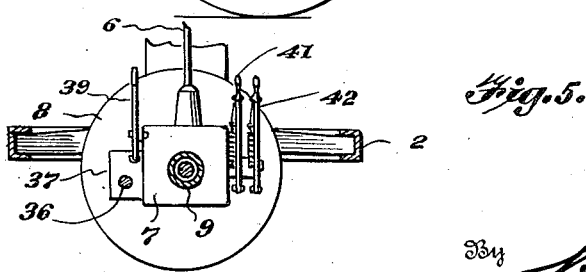
Fig. 5 is a fragmentary view on the line 5—5 of Fig. 1.

When an automobile is suspended from the cable by the hook 18', the weight of the automobile will cause unwinding of the cable from the drum when the gear 38 is shifted to inoperative position, but when there is no weight upon the free end of the cable other than that of the hook, there will not be sufficient weight to unwind the cable from the drum. It would then be necessary for the operator of the truck to manually unwind the cable and, in order to make this manual unwinding of the cable unnecessary, there has been provided a small electric motor 45 which is mounted in conventional position upon the chassis, as shown in Fig. 2, and has its shaft equipped with a pulley 46. This motor is driven by current received from the battery 47 of the truck and operation of the motor is controlled by a switch 48 on the instrument board of the truck.

When it is desired to have the cable 18 unwind and the hook move downwardly to a position in which it may be engaged under the axle of the automobile to be lifted and towed, it is merely necessary to close the switch and the motor 45 will be started. Rotation will then be transmitted from the motor to the countershaft 33 by the belt 50 trained about the pulley 46 of the motor and the pulley 51 carried by the drive shaft and the countershaft will then be turned in a direction to effect rotation of the drum 15 in an unwinding direction and the weight of the hook will be sufficient to draw the free rear end of the cable downwardly. Operation of the motor will be shut off when the cable has been sufficiently unwound to permit the hook to be engaged about the axle of the automobile to be towed and the crane will then be power-started and operated to wind the cable upon the drum and raise the front end of the automobile to towing position. When the service station is reached it is not necessary to operate the electric motor to unwind the cable from the drum as the weight of the automobile will be sufficient to do so when the latch is released and the gear 38 is moved to inoperative position. During lowering of the automobile, the brake 32 will be employed to control the speed at which the automobile is lowered.

Having thus described the invention, what is claimed is:

1. In an automotive towing vehicle having a chassis and a cab and a power plant under the cab including a transmission embodying a gear shift mechanism provided with a power take-off, a box on the rear portion of the chassis back of the cab, a crane mounted in said box and including a drum having a cable wound thereon and provided at its outer end with a grapple, a drive shaft for the crane having geared connection with the drum, a transmission shaft extending diagonally through the bottom of the box at a rearwardly upward incline and at its upper rear end having a differential connection with the drive shaft, a countershaft extending longitudinally of the chassis under the cab and having its rear end connected with the transmission shaft, a power take-off shaft extending rearwardly from the power take-off and having its rear end connected with the front end of the countershaft, a geared connection between the power take-off shaft and the transmission of the power plant including a gear shiftable along the power take-off shaft into and out of operative position, adjusting means for said gear including a lever extending upwardly into the cab, a brake for the drive shaft of the crane having actuating means operable from within the cab, and auxiliary driving means for the countershaft including an electric motor in circuit with the battery of the vehicle, and means for transmitting rotation from the motor to the countershaft in a direction to effect unwinding of the cable from the drum.

2. In an automotive towing vehicle having a chassis and a cab and a power plant including a transmission having a gear shift mechanism provided with a power take-off, a platform on the rear portion of the chassis back of the cab, a crane mounted on the platform and having a drum and a cable wound thereon and provided at its outer end with a grapple, a drive shaft for the crane having geared connection with the drum, a transmission shaft extending through the platform at an upward incline toward its rear end and at its rear end having a differential connection with the drive shaft, a countershaft extending longitudinally of the chassis and having its rear end connected with the front end of the transmission shaft, a power take-off shaft having its rear end connected with the front end of the countershaft, a geared connection between the power take-off shaft and the transmission of the power plant including a gear shiftable along the power take-off shaft into and out of operative position, an adjusting lever for said gear extending upwardly into the cab, an auxiliary electric motor carried by the chassis in front of the platform and driven by the battery of the vehicle, pulleys carried by the motor shaft and the countershaft, and a belt trained about the pulleys for transmitting rotation from the motor to the countershaft in a direction to effect unwinding of the cable from the drum.

3. In an automotive towing vehicle having a chassis and a power plant including a transmission having a gear shift mechanism provided with a power take-off at one side, a crane on the rear portion of the chassis having a cable drum, a drive shaft rotatably mounted across the crane under the drum and having geared connection with the drum, a transmission shaft extending longitudinally of the chassis at a rearwardly upward incline and having a differential connection with the drive shaft at its rear end, means for transmitting rotary motion from the power take-off to the lower front end of the transmission shaft including a rotatably mounted shaft, manually adjustable means carried by the gear shift mechanism for controlling operation of the last mentioned means and having an actuating lever extending into the cab of the towing vehicle, and auxiliary means for effecting rotation of the last mentioned shaft in a direction for rotating the drum in an unwinding direction consisting of an electric motor driven from the battery of the vehicle, and means for transmitting rotary motion from the motor to the last mentioned shaft.

DE WITT WEBSTER.